United States Patent [19]
Manser

[11] Patent Number: 5,862,584
[45] Date of Patent: Jan. 26, 1999

[54] AUTOMATED APPARATUS FOR CUTTING AND NOTCHING STOCK MATERIAL

[76] Inventor: Russell D. Manser, 12259 Dentonview, Fenton, Mich. 48430

[21] Appl. No.: 738,368

[22] Filed: Oct. 25, 1996

Related U.S. Application Data

[60] Provisional application No. 60/007,024 Oct. 25, 1995.

[51] Int. Cl.⁶ .............................. B23Q 15/14; B27C 9/00; B23C 3/28; B77B 5/20
[52] U.S. Cl. .............................. 29/560; 83/76.1; 83/404; 144/3.1; 409/132
[58] Field of Search .............................. 29/560, 563, 564, 29/36 A, 33 P; 144/3.1, 1.1, 41, 48.1, 136.9; 83/404, 76.1, 371, 487; 409/132, 131

[56] References Cited

U.S. PATENT DOCUMENTS

| | | | |
|---|---|---|---|
| 3,685,129 | 8/1972 | Jureit et al. | 144/3.1 X |
| 4,098,310 | 7/1978 | Sanford et al. | 144/3.1 X |
| 4,936,360 | 6/1990 | Wright | 144/136.9 |
| 4,944,339 | 7/1990 | Luyten | 29/33 P X |
| 4,945,958 | 8/1990 | Shoda | 26/26 A X |
| 5,094,282 | 3/1992 | Susuki et al. | 29/563 X |
| 5,165,458 | 11/1992 | Hirsch | 144/3.1 |
| 5,365,812 | 11/1994 | Harnden | 83/487 X |
| 5,400,841 | 3/1995 | Holbert | 144/48.1 |

FOREIGN PATENT DOCUMENTS

| | | | |
|---|---|---|---|
| 2578777 | 9/1986 | France | 144/1.1 |
| 2749546 | 5/1979 | Germany | 144/3.1 |
| 3540448 | 5/1987 | Germany | 83/404 |

*Primary Examiner*—William R. Briggs
*Attorney, Agent, or Firm*—Young & Basile, P.C.

[57] ABSTRACT

An apparatus is disclosed for automatically cutting stock material for a grid. The apparatus comprise at least one saw assembly positionable to selectively cut the stock material into individual grid elements for the grid, a conveyor system operable to present the stock material for cutting by the at least one saw assembly, and a computer controller operable to generate instructions directing the operation of the conveyor system and the positioning of the at least one saw assembly so as to automatically cut the stock material into the grid elements.

28 Claims, 4 Drawing Sheets

AUTOMATED APPARATUS FOR CUTTING AND NOTCHING STOCK MATERIAL

REFERENCE TO THE PRIOR APPLICATIONS

This application claims the benefit of U.S. provisional Application Ser. No. 60/007,024, filed Oct. 25, 1995.

FIELD OF THE INVENTION

The invention pertains to automated machine tools for processing of elongated stock materials, and particularly, for cutting to length and notching muntin bar material such as that used in decorative insulated windows and doors.

BACKGROUND OF THE INVENTION

When transparent glass panes first became available for widespread use by consumers, large panes of such glass were prohibitively expensive and difficult to form. As a result, early windows and doors were constructed of a plurality of small, inexpensive, easily manufactured glass panes. Early windows and doors were characterized by a grid-like cross-hatched appearance as a result. The windows and doors of many old houses are a testament to this early technology.

Glass manufacturing technology rapidly advanced, however, making possible the introduction of the "picture window", a name sometimes applied to large panes of glass. While large uninterrupted panes of glass gained substantial popularity as early as the 1940's, doors and windows having multiple glass panes are considered by many to be more aesthetically pleasing. The irony of technology, however, is that the earlier design of windows and doors consisting of multiple panes of glass separated by dividing elements is now much more expensive to produce than a single pane window.

In order to meet the demand for doors and windows having the appearance of older style, multiple-pane assemblies, a number of techniques have been adopted to give an aesthetically pleasing appearance to a single large pane of glass.

It is commonly known to produce a unitary latticework of wood, metal or plastic, and apply this latticework to one side of a large contiguous sheet of glass. From a distance, the ordinary observer sees the assembly as comprised of multiple panes of glass constructed and assembled by the latticework. In fact, if two identical such latticework appliques are placed on opposite sides of a single pane of glass, it is difficult, without close inspection, to perceive that the assembly is, in fact, a decorative simulation of multiple panes of glass.

In recent years, with the escalating cost of energy, more and more buildings have incorporated insulated glass windows and doors in place of earlier single pane windows and doors, which are notoriously poor insulators. Modern insulated glass consists of multiple glass sheets, separated by spacers at the perimeter of the sheets, and then sealed together with a semi-flexible rubber-like compound. Such a sandwich of glass and air provides an enclosed insulating air space, which results in desirable thermal insulating properties.

Double-paned assemblies, however, are not easily disguised by latticework appliques to simulate the appearance of multi-panel windows and doors. Because there is a space of approximately ⅜" between the glass panels, the application of a latticework applique is not aesthetically pleasing. A more suitable visual effect is obtained by inserting a latticework assembly between the two glass panes. Windows and doors containing such internal latticeworks have become very popular in modern commercial and residential buildings.

The construction of an insulated window using such internal grid work is, however, a process which is relatively work-intensive. Because there are an infinite number of sizes and shapes of windows and doors in use today, the manufacture of grid work for glass panes dictates the availability of an equally infinite variety of gridwork assemblies. This problem is further compounded by the popularity of two distinct gridwork styles: those which are primarily rectangular in appearance, i.e., having essentially vertical and horizontal members; and those which have a diamond appearance, where the intersecting members of the grid are inclined at angles which are not strictly horizontal or vertical.

The manufacture of each individual gridwork element, therefore, requires several steps. First, the type of gridwork pattern to be incorporated in the window or door must be determined. Further, the dimensions of the finished insulated glass pane must be determined. The final determination is the spacing of the various intersection gridwork elements. With these parameters, it is possible to cut the individual intersecting elements of the grid to their appropriate lengths. Finally, the intersecting elements must be notched along their length, so that the completely assembled gridwork will have a uniform thickness, measured from front to back, to fit within the appropriate insulated glass insulation space.

The material which is most commonly used for the construction of this gridwork is an extruded aluminum tube of rectangular cross-section, which is painted or clad in an appropriate color. Originally, the manufacture of the gridwork required the determination steps above-described, followed by manual cutting of the extruded aluminum element from an elongated piece of stock material, known as a muntin bar. Muntin bar is typically supplied in lengths of 144", providing enough stock material for several individual grid elements.

In the existing technology, the manufacture of the gridwork is done essentially by hand, with manual computation of the lengths of grid elements required to be cut from the available lengths of muntin bar. Likewise, manual computations of the locations for notching the grid elements are performed. It is important to note that when manufacturing diagonally-oriented of grid elements, it is frequently necessary to insure that the ends of the elements are cut at the appropriate angle, so that the ends will fit flush with the interior surface of the spacer which separates the panes of the insulated glass. This additional requirement further complicates the manufacture of diagonally oriented grid elements.

Recently, a number of computer programs have become available which assist the workmen in the cutting and notching of grid elements, by providing information regarding the angles of the ends of the grid elements, as well as the precise location for the notches where the grid elements will fit together. Still, the cutting and notching operations take place manually, requiring the workmen to move the raw stock muntin bar into position against either a cutting saw or router, and positioning the angle of the cutting saw or router manually, based on the computations made either manually, or by the computer program. Modern systems, such as the muntin notcher and muntin angle and trim saw produced by McKeegan Equipment & Supply Company of Plymouth, Michigan, provide minimal digital readout settings, and manual stops for manual positioning of the muntin bar at the cutting or notching stage of a machine. These processes, even though improved, are still work-intensive, time-consuming and expensive. The present invention overcomes each of these limitations.

SUMMARY OF THE INVENTION

In the present invention, an automated muntin bar cutter and notcher provides a substantial improvement over current methods and apparatus. The invention comprises a work surface equipped with computer-controlled conveyor means which transports raw muntin bar stock into position for cutting and notching with a high degree of precision. Utilizing the present invention, an uncut length of muntin bar is fed into the operating stage of a machine comprising both a router for notching and a saw for cutting. Utilizing a sophisticated computer program which analyzes window or door size, a grid pattern and grid spacing, a series of instructions for cutting and routing is generated and fed to a computer/machine interface associated with the conveyors, the router and the cutting blade. The instructions so provided cause the bar stock to be cut, notched and advanced under computer control, without further operator intervention. In this fashion, both the end cuts, as well as the position of the notches for interlocking grid elements are created in a continuous repetitive operation, without the need for significant operator intervention.

This and other objects of the invention will be readily apparent upon reference to the attached drawings and detailed description.

DESCRIPTION OF THE PREFERRED EMBODIMENT

Figure 1:
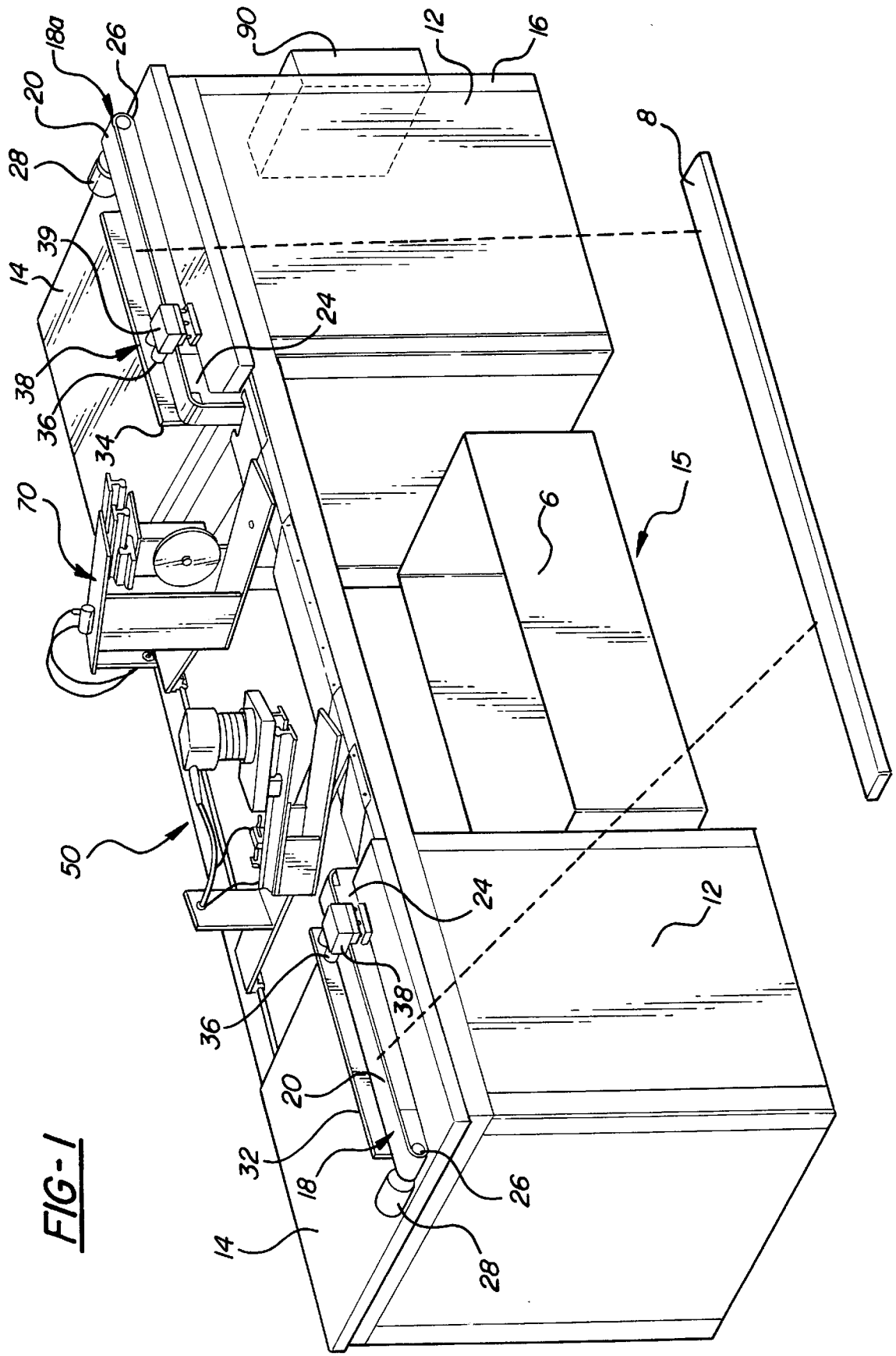
FIG. 1 is a perspective view of a first embodiment of the invention, showing the relationship of the various individual conveying, routing and cutting elements.

By reference first to FIG. 1, it will be possible to understand the various individual elements comprising the invention, as well as their interrelation.

The invention first comprises a frame 16 consisting of a plurality of sturdy interconnected frame elements which house base compartments 12, and which supports top surfaces 14. In the preferred embodiment, the frame and the various elements of the base cabinet and top surface are of steel, providing a solid platform on which to mount the various operating components. Preferably, the frame includes a discharge space 15 capable of accepting a waste hopper 6, positionable below the operating positions of router assembly 50 and saw assembly 70.

Figure 2:
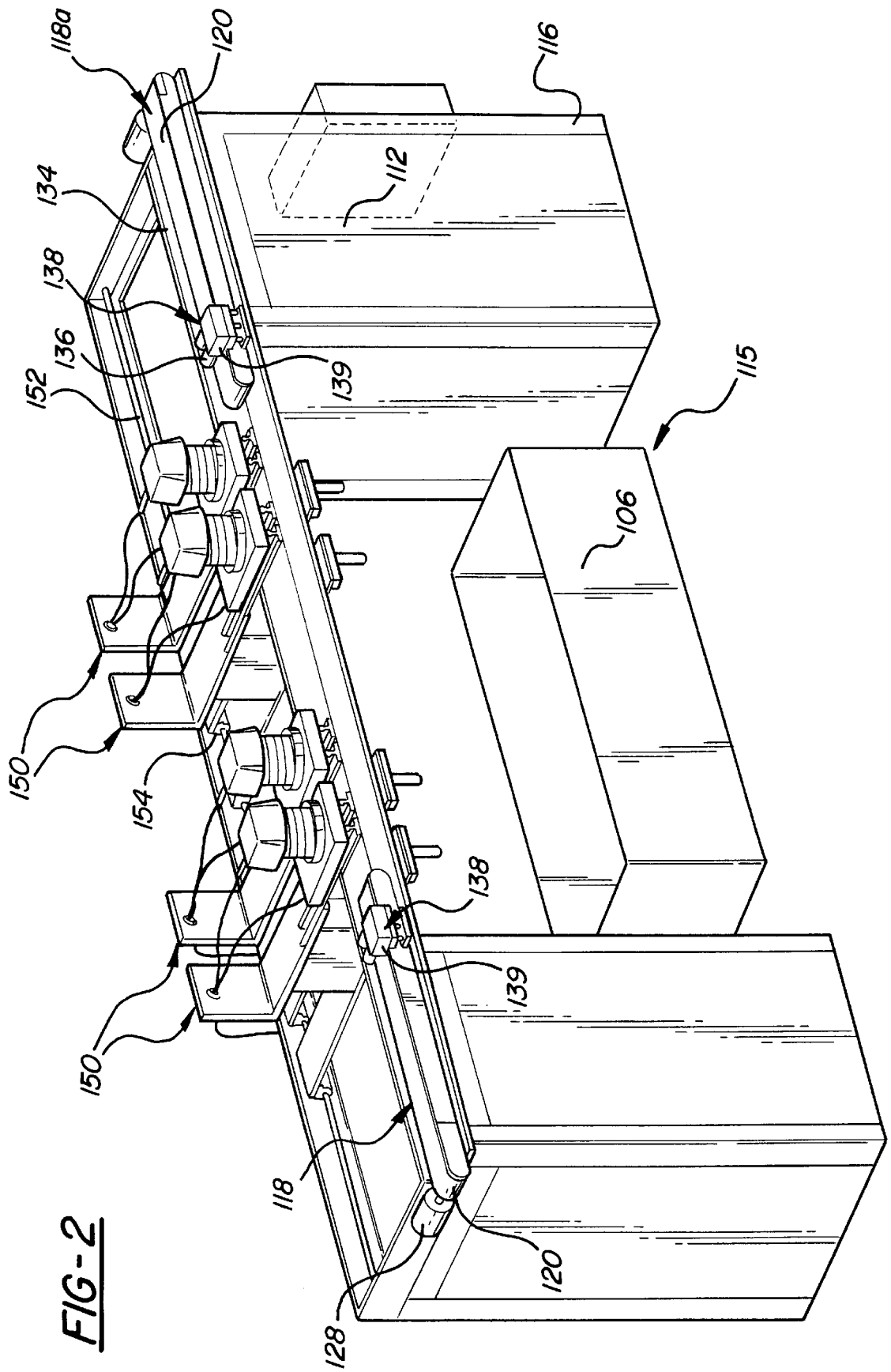
FIG. 2 is a perspective view of a second embodiment of the invention, showing the incorporation of multiple routing elements.

Affixed to the top surface 14 of the frame 16 is a conveyor system including first 18 and second 18a conveyor regions provided in synchronous connection by a single conveyor belt 20 extending therebetween. Of course, it is also envisioned that the conveyor system comprise two separate conveyor systems 118 and 118a (FIG. 2.). Still referring to FIG. 1, conveyor regions 18 and 18a operate under computer control to precisely advance or rewind conveyor belt 20 in relation to drive rollers 26 which are affixed to drive frame 24. At least one of the drive rollers 26 is driven by conveyor drive motor 28, in response to conveyor drive signals supplied to the conveyor drive motor 28 from the controls interface 90 located within compartment 12. In the preferred embodiment, first 18 and a second 18a conveyor regions are situated on top surface 14, to provide support and drive engagement for stock materials. In order to avoid interference with either router 50 or saw 70 assemblies, that portion of conveyor belt 20 interconnecting first 18 and second 18a conveyor regions and extending between base compartments 12 is situated below top surface 14. In this fashion, conveyor drive means are positioned at both the feed and discharge ends of the top surface 14, insuring support for the stock material 8 throughout the notching and cutting process. Conveyor pressure roller assemblies 38 include roller support blocks 39 and pressure rollers 36. The pressure roller assemblies are positioned in relation to the conveyor belt upper surfaces providing sufficient clearance to insure that stock material is held firmly against the upper surface of conveyor belt 20, thereby insuring a positive feed with minimal slippage. In the preferred embodiment, pressure roller assemblies 38 are retractable and repositionable under computer control to facilitate positioning of the stock material 8 on the upper surface of the conveyor belt 20 without undue interference from the pressure rollers 36 until such time as the pressure rollers 36 are activated and brought into contact with the upper surface of the stock material 8. Immediately adjacent to the conveyor assemblies are fences 32 and 34, against which the stock material 8 is placed at both the feed and discharge ends of the invention, thereby insuring proper positioning of the stock material 8 in relation to the router assembly 50 and the saw assembly 70.

The router assembly 50 and saw assembly 70 are pivotally mounted between top surfaces a shown allowing horizontal movement of the router assembly 50 and saw assembly 70 through a limited arc parallel to the top surface of the stock material 8 as it is transported by the first 18 and second 18a conveyor regions.

Figure 3:
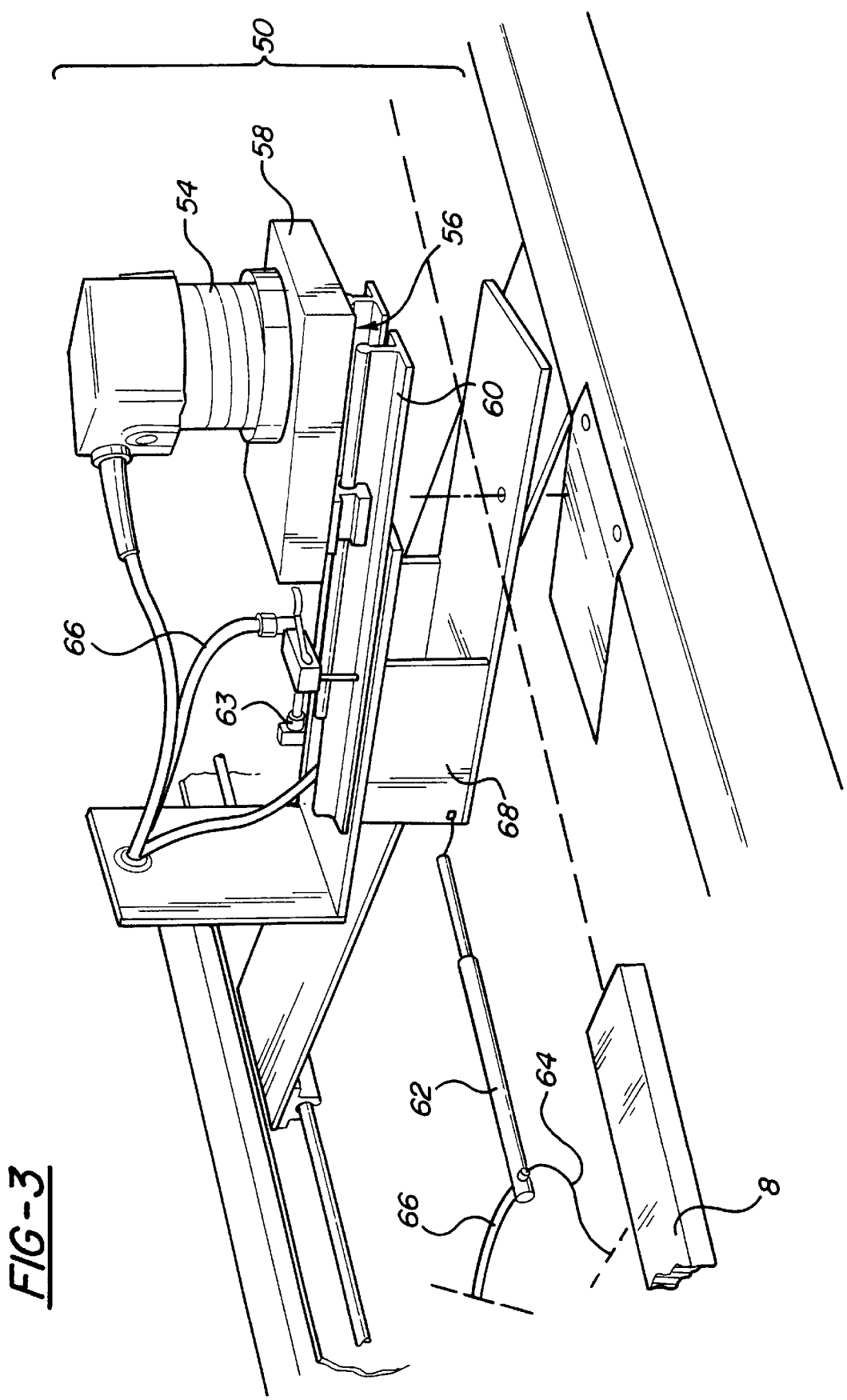
FIG. 3 is a detailed view of the router assembly, showing the router, pivoting and linear movement elements.

As shown in FIG. 3, router pivot 68 permits horizontal arcuate movement of the router assembly 50. The angular position of the router assembly 50 is determined by the position of an accurate actuator 62, preferably in the form of a pneumatic cylinder having feedback means, and positionable under computer control. In this fashion, the angular position of the router 50 and carrier 58 can be predetermined and selected. The router assembly 50 includes a router carrier 58 which is slidably connected to a carrier rail 60. A linear actuator 63 affixed to router carrier 58 and carrier rail 60 allows precise positioning of the router motor 54 and its associated cutting tool 56 in relation to stock material 8. By applying appropriate angular position signals to a router accurate actuator 62 and router linear actuator 63, a notch may be easily placed at any position and at varying angles in relation to the centerline of the stock material 8.

Pneumatic pressure is applied to the router actuators 62 and 63 from each actuator through pressure line 66, and actuator position feedback is provided to the control interface 90 (not shown in FIG. 3) through signal line 64.

Figure 4:
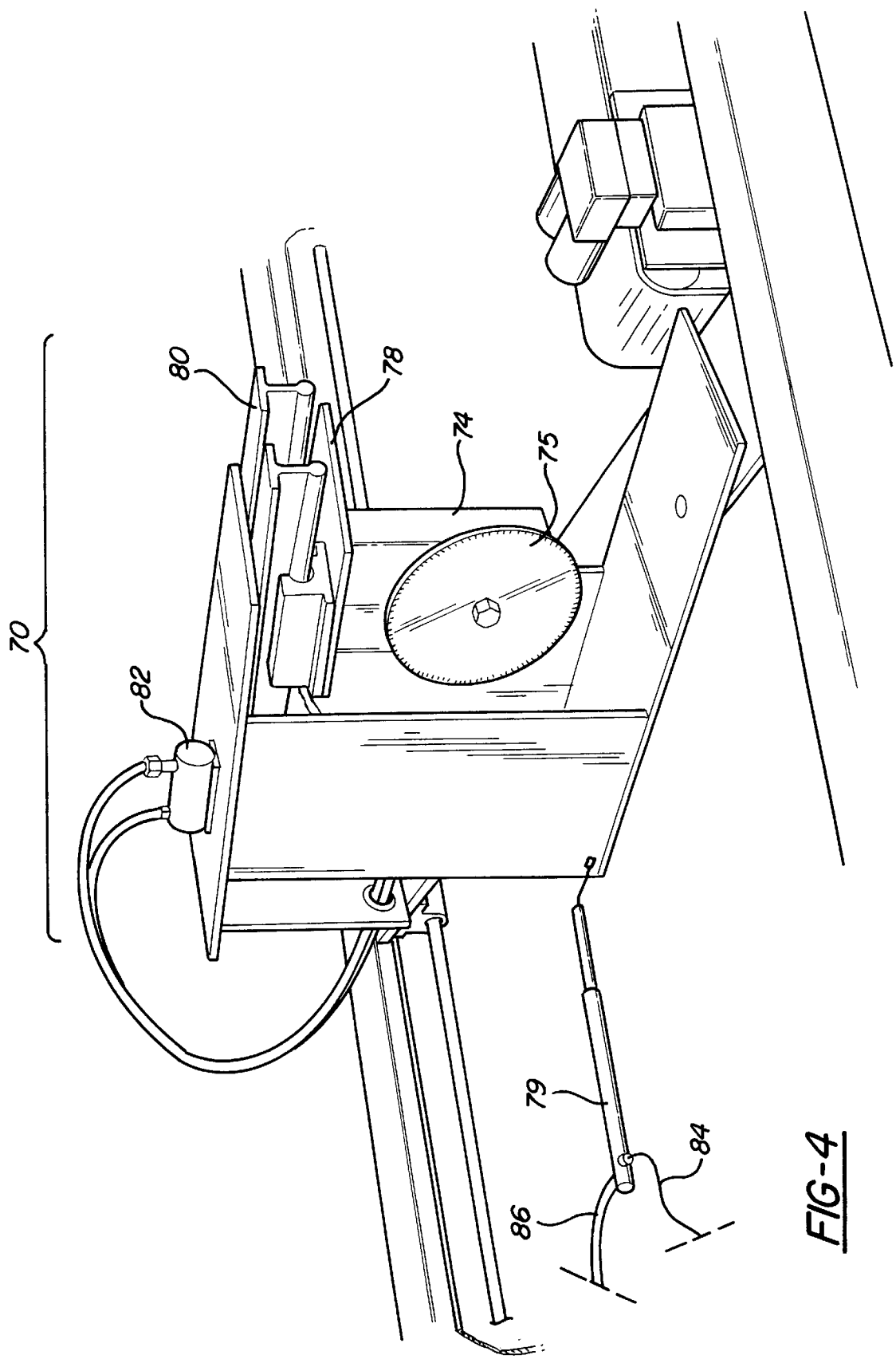
FIG. 4 is a detailed view of the saw assembly, again showing the pivoting, and linear movement elements.

With reference now to FIG. 4, the detail of the saw assembly 70 will be understood. In the same fashion as described in the above paragraphs pertaining to the router operation, the saw assembly 70 may be positioned and actuated under computer control, allowing both angular movement and linear movement of the saw motor carrier 78 in relation to the stock material 8 (not shown in FIG. 4). The saw blade 75 is affixed to the shaft of saw motor 74, which in turn is affixed to the saw carrier 78, slidably affixed to saw carrier rail 80. The movement of the saw carrier in relation to the saw carrier rail is accomplished by a saw linear actuator 82 which positions the saw carrier 78 in relation to the saw carrier rail 80. Likewise, saw assembly angular actuator 79 serves to position the saw assembly 70 in angular relation to the centerline of stock material 8 (not shown). Pneumatic and electronic signals are provided through pneumatic lines 86 and signal lines 84.

With reference to FIGS. 1, 3 and 4, the operation of the conveying, routing and cutting heads is controlled by a computer (not shown) which in turn, is connected to a control interface panel 90 mounted to the frame 16. In the preferred embodiment, the dimensions of the desired window or door grid assembly are input into the computer, which then converts the dimensional data and grid size into a series of parameters for each individual grid element. These parameters include the length of each grid section, the angle of the end cut for each section in relation to the longitudinal centerline of the grid element, the position and angle of each notch required in each grid element to insure correct positioning of the grid elements in interlocking relationship upon assembly. The dimensions of each component may be presented to the machine operator in the form of either a video display on a video display terminal, or in the form of a printout. In either event, the operator is instructed to insert into the feed side of the machine a stock piece having a specified minimum length. In the preferred embodiment, the computer program provides to the operator a suggested length to use, if a single piece is being formed. For example, if a diagonal element for a diamond grid is required, the computer determines the overall length which will be required, in consideration of the angular cuts to be made at each end, and provides the operator with a suggested raw material length. If it is desired to produce multiple pieces, it is anticipated that the operator will simply insert the longest available length of stock. However, the optimum length of stock will also be determinable by the computer program, if it is desired. Once the recommended stock material has been selected, it is placed by the operator on the feed conveyor, abutting the fence and passing under the pressure roller, so that the feed end of the stock is presented to a point adjacent the cutting and routing assemblies. The roller assemblies are then lowered into their appropriate positions to secure the stock material to the upper surface of the feed conveyor. The operator then issues a start command to the computer to begin the automated process. First, the saw assembly is rotated under machine control to position adjacent the feed end of the stock material. The saw blade motor is then instructed to start, causing the saw blade to rotate at high speed. The saw blade carrier is then extended across the stock material 8 by the relative movement of the saw blade carrier 78 and the saw blade rail 80, resulting in the first end cut of the stock material. Waste from the cut falls by gravity into waste hopper 6, where waste is collected for ultimate disposal.

Once the cut has been completed, the saw blade carrier retracts again by virtue of relative movement between the saw blade carrier 78 and saw blade rail 80, and the saw motor is turned off. The stock material is then advanced across the operating stage of the machine by movement of the conveyor belt 20, until the stock material is correctly positioned for further cutting or notching.

If notching of the stock material is required, instructions are provided by the computer to rotate the router assembly 50 to the correct angular position in relation to the longitudinal centerline of the stock material 8. The router motor is then activated, again by machine control, and the router carrier 58 is extended linearly toward the stock material 8 by virtue of relative movement between the router carrier 58 and the carrier rail 60. The router cutter tool 56 engages the stock material 8, thereby routing the appropriate cut in stock material 8, at the appropriate angle to the longitudinal centerline of the stock material 8. The router carrier is then retracted away from the stock material 8 by virtue of relative movement between the router carrier 58 and the carrier rail 60, and the router motor 54 is turned off. Thereafter, the stock material is advanced by conveyor belt 20, again under machine control, by an appropriate incremental distance to insure that the stock material is now positioned for an additional cut or notch operation, depending on the desired configuration of the grid element.

This process is repeated continuously, so that individual grid elements can be cut and notched, one after the other, until the stock material 8 has been exhausted.

The second embodiment of my invention can be seen by reference now to FIG. 2.

In all respects, operation of the second embodiment of the invention is comparable to the operation of the invention as shown in FIG. 1, with the exception of the fact that embodiment shown in FIG. 2 contemplates the incorporation of several router assemblies 150 affixed to the upper surface of frame 116, having compartments 112 for purposes of enclosing the electronics and controls (not shown). In this second embodiment, a plurality of router assemblies 150 are slidably mounted to frame 116 by virtue of rails 152 and riders 154, which permit the repositioning of router assemblies 150 along the length of the frame 116. Saw assemblies 170 (not shown), similar to those shown as item 70 in FIG. 1, may also be mounted to the frame. A pair of conveyor assemblies 118 and 118a cooperate with drive motors 128 and conveyor belts 120, and they are equipped with conveyor belts 120, for the purpose of transporting stock material across the working stage of each router assembly 150. Pressure roller assemblies 139 provided with pressure roller mounting blocks 138 and pressure rollers 136 serve to hold the stock material in firm contact with the conveyor belts 120. In conjunction with fences 132 and 134, stock material is guided precisely to an appropriate position in relation to router assemblies 150. When the stock material has been correctly positioned, router assemblies 150 may be selectively operated, either individually or collectively, to place notches in appropriate locations along the length of the stock material. In this fashion, numerous notches may be simultaneously placed in a single piece of stock material in a single operation. As in the previously described embodiment, a space 115 is preferably equipped with waste bin 106 for the purpose of catching cuttings from the routing operation for later disposal. In the same fashion described in the first embodiment, it is contemplated that the location of the cuttings made by the routers will take place under computer control, based on previously entered data regarding the length of the stock material, its position in relation to the router, and the desired location of the cuttings in the stock material.

Of course, it will be appreciated that the foregoing is merely illustrative of one embodiment of the present invention, and many changes and modifications thereto, apparent to those of skill in the art, are possible without departing from the spirit and broader aspects of the present invention as set forth in the appended claims.

The invention in which an exclusive property or privilege is claimed is defined as follows:

1. An apparatus for automatically notching stock material for a grid, comprising:
   at least one router assembly positionable to selectively notch the stock material;
   a conveyor system operable to present the stock material for notching by said at least one router assembly; and
   a computer controller operable to both generate parameters for notching the stock material for said grid, and to generate instructions directing the operation of said conveyor system and the positioning of said at least one router assembly so as to automatically notch the stock material according to said parameters, wherein said parameters for notching the stock material include parameters corresponding to the position and angle of each notch to be made by said at least one router.

2. The apparatus of claim 1, further including at least one saw assembly positionable to selectively cut the stock material into grid elements for said grid, said at least one saw assembly directed by said computer controller so as to automatically cut the stock material, wherein further said computer controller is operable to both generate parameters for cutting the stock material into grid elements for said grid, and to generate instructions directing the positioning of said at least one saw assembly so as to automatically cut the stock material into grid elements according to said parameters, wherein said parameters for cutting the stock material include parameters corresponding to the length of the grid elements to be cut, and the angle of each cut to be made by said at least one saw assembly.

3. The apparatus of claim 2, wherein said at least one router assembly and said at least one saw assembly are each linearly and angularly positionable with respect to the longitudinal axis of said conveyor system via linear and angular actuators, said linear and angular actuators being operatively connected to and receiving said instructions from said computer.

4. The apparatus of claim 3, further including a frame, and wherein said saw assembly comprises a housing pivotally disposed on said frame, a saw carrier rail provided on said housing, and a saw carrier movably disposed on said saw carrier rail, one of said linear actuators being operative to position said saw carrier along said saw carrier rail, one of said angular actuators being operative to position said saw assembly in angular relation to said frame, and wherein further said at least one router assembly comprises a router pivot pivotally disposed on said frame, a router carrier rail provided on said router pivot, and a router carrier movably disposed on said router carrier rail, one of said linear actuators being operative to position said router carrier along said router carrier rail, and one of said angular actuators being operative to permit horizontal arcuate positioning of said router assembly in relation to said frame.

5. The apparatus of claim 4, wherein said linear and angular actuators comprise pneumatic actuators.

6. The apparatus of claim 1, further including pressure rollers engageable with the stock material to maintain the stock material in driving engagement with said conveyor system.

7. The apparatus of claim 6, wherein said pressure rollers are operatively connected to said computer controller so as to be automatically selectively engageable with the stock material.

8. The apparatus of claim 6, further including at least one fence provided in parallel alignment with the longitudinal axis of said conveyor system to ensure proper positioning of the stock material in relation to said at least one saw assembly and said at least one router assembly.

9. An apparatus for automatically cutting and notching stock material for a grid, comprising:
   at least one saw assembly positionable to selectively cut the stock material into grid elements for said grid;
   at least one router assembly positionable to selectively notch the stock material;
   a conveyor system operable to present the stock material for cutting by said at least one saw assembly and notching by said at least one router assembly; and
   a computer controller operable to generate parameters for both notching the stock material for said grid and cutting the stock material into grid elements, and to further generate instructions directing the operation of said conveyor system and the positioning of said at least one saw assembly and said at least one router assembly so as to automatically notch the stock material and cut the stock material into grid elements according to said parameters, wherein said parameters for notching the stock material include parameters corresponding to the position and angle of each notch to be made by said at least one router, and said parameters for cutting the stock material include parameters corresponding to the length of the grid elements to be cut, and the angle of each cut to be made by said at least one saw assembly.

10. The apparatus of claim 9, wherein said at least one router assembly and said at least one saw assembly are each linearly and angularly positionable with respect to the longitudinal axis of said conveyor system via linear and angular actuators, said linear and angular actuators being operatively connected to and receiving said instructions from said computer.

11. The apparatus of claim 10, further including a frame, and wherein said saw assembly comprises a housing pivotally disposed on said frame, a saw carrier rail provided on said housing, and a saw carrier movably disposed on said saw carrier rail, one of said linear actuators being operative to position said saw carrier along said saw carrier rail, one of said angular actuators being operative to position said saw assembly in angular relation to said frame, and wherein further said at least one router assembly comprises a router pivot pivotally disposed on said frame, a router carrier rail provided on said router pivot, and a router carrier movably disposed on said router carrier rail, one of said linear actuators being operative to position said router carrier along said router carrier rail, and one of said angular actuators being operative to permit horizontal arcuate positioning of said router assembly in relation to said frame.

12. The apparatus of claim 11, wherein said linear and angular actuators comprise pneumatic actuators.

13. The apparatus of claim 9, further including pressure rollers engageable with the stock material to maintain the stock material in driving engagement with said conveyor system.

14. The apparatus of claim 13, wherein said pressure rollers are operatively connected to said computer controller so as to be automatically selectively engageable with the stock material.

15. The apparatus of claim 13, further including at least one fence provided in parallel alignment with the longitudinal axis of said conveyor system to ensure proper positioning of the stock material in relation to said at least one saw assembly and said at least one router assembly.

16. An apparatus for automatically cutting and notching stock material for a grid, comprising:

a frame;

at least one saw assembly linearly and angularly positionable with respect to the longitudinal axis of said conveyor system via linear and angular actuators to selectively cut the stock material into individual grid elements for said grid;

at least one router assembly linearly and angularly positionable with respect to the longitudinal axis of said conveyor system via linear and angular actuators to selectively notch the stock material;

a conveyor system operable to present the stock material for both cutting by said at least one saw assembly and notching by said at least one router assembly;

a computer controller operable to generate instructions directing the operation of said conveyor system and each of said linear and angular actuators so as to position said at least one saw assembly and said at least one router assembly to automatically notch the stock material and cut the stock material into grid elements for said grid; and wherein said saw assembly comprises a housing pivotally disposed on said frame, a saw carrier rail provided on said housing, and a saw carrier movably disposed on said saw carrier rail, one of said linear actuators operative to position said saw carrier along said saw carrier rail, one of said angular actuators being operative to position said saw assembly in angular relation to said frame, and wherein further said at least one router assembly comprises a router pivot pivotally disposed on said frame, a router carrier rail provided on said router pivot, and a router carrier movably disposed on said router carrier rail, one of said linear actuators being operative to position said router carrier along said router carrier rail, and one of said angular actuators being operative to permit horizontal arcuate positioning of said router assembly in relation to said frame.

17. The apparatus of claim 16, further including pressure rollers engageable with the stock material to maintain the stock material in driving engagement with said conveyor system.

18. The apparatus of claim 17, wherein said pressure rollers are operatively connected to said computer controller so as to be automatically selectively engageable with the stock material.

19. The apparatus of claim 18, further including at least one fence provided in parallel alignment with the longitudinal axis of said conveyor system to ensure proper positioning of the stock material in relation to said at least one saw assembly and said at least one router assembly.

20. The apparatus of claim 19, wherein said linear and angular actuators comprise pneumatic actuators.

21. A method for automatically notching stock material for a grid, comprising the steps of:

providing at least one router assembly positionable to selectively notch the stock material;

providing a conveyor system operable to present the stock material for notching by said at least one router assembly;

providing a computer controller operable to both generate parameters for notching the stock material for said grid, and to generate instructions based upon said parameters, said instructions directing the operation of said conveyor system and the operation of said at least one router assembly;

generating said parameters at said computer for notching the stock material, said parameters for notching the stock material including parameters corresponding to the position and angle of each notch to be made by said at least one router;

placing a length of stock material on said conveyor system; and automatically notching the stock material further to said instructions from said computer controller based upon said parameters.

22. The method of claim 21, further including the step of automatically advancing the stock material on said conveyor system for additional notching by said at least one router assembly.

23. The method of claim 22, further including the step of determining the overall length of the stock material placed on said conveyor system for notching.

24. The method of claim 23, further including the step of providing at least one saw assembly positionable to selectively cut the stock material into grid elements for said grid, wherein said computer controller is further operable to both generate parameters for cutting the stock material into grid elements for said grid, and to generate instructions based upon said parameters, said instructions directing the operation of said at least one saw assembly, and wherein said step of generating parameters for notching the stock material further includes generating parameters for cutting the stock material into grid elements for said grid, and further including the step of automatically cutting the stock material into grid elements further to instructions from said computer controller based upon said parameters.

25. The method of claim 24, wherein the step of generating parameters for cutting the stock material includes generating parameters corresponding to the length of the grid elements to be cut and the angle of each cut to be made by said at least one saw assembly.

26. A method for automatically cutting and notching stock material for a grid, comprising the steps of:

providing at least one saw assembly positionable to selectively cut the stock material into grid elements for said grid;

providing at least one router assembly positionable to selectively notch the stock material;

providing a conveyor system operable to present the stock material for cutting by said at least one saw assembly and notching by said at least one router assembly;

providing a computer controller operable to both generate parameters for notching the stock material and cutting the stock material into grid elements for said grid, and to generate instructions based upon said parameters, said instructions directing the operation of said conveyor system and the operation of both said at least one saw assembly and said at least one router assembly;

generating said parameters at said computer controller for notching the stock material and cutting the stock material into the grid elements, said parameters for cutting and notching the stock material including parameters corresponding to the length of the grid elements to be cut and the angle of each cut to be made by said at least one saw assembly, and the position and angle of each notch to be made by said at least one router;

placing a length of stock material on said conveyor system; and automatically notching the stock material and cutting the stock material into grid elements further to said instructions from said computer controller based upon said parameters.

27. The method of claim 26, further including the step of automatically advancing the stock material on said conveyor system for additional cutting by said at least one saw assembly or additional notching by said at least one router assembly further to said instructions from said computer controller based upon said parameters.

28. The method of claim 27, further including the step of determining the overall length of the stock material placed on said conveyor system for cutting and notching.

* * * * *